Dec. 13, 1955   C. ZELNICK   2,726,626
DIAL TEST INDICATOR
Filed Jan. 19, 1953   2 Sheets-Sheet 1

INVENTOR.
Charles Zelnick.
BY
Learman & Learman
ATTORNEYS

Dec. 13, 1955  C. ZELNICK  2,726,626
DIAL TEST INDICATOR

Filed Jan. 19, 1953  2 Sheets-Sheet 2

INVENTOR.
Charles Zelnick.
BY
Searman & Searman
ATTORNEYS

United States Patent Office

2,726,626
Patented Dec. 13, 1955

---

2,726,626

DIAL TEST INDICATOR

Charles Zelnick, Saginaw, Mich., assignor to The Lufkin Rule Company, Saginaw, Mich.

Application January 19, 1953, Serial No. 331,890

1 Claim. (Cl. 116—129)

This invention relates to dial test indicators of the type commonly employed for determining surface flatness, alignment, out of roundness, relative height, locations, and other checking functions, and more particularly to a new and improved bezel unit or assembly therefor.

As is well known, indicators of the general construction shown in Patent No. 2,345,845, and others of similar construction wherein tensioned snap-on bezel rings are employed, are exceedingly difficult to assemble and disassemble to replace, and/or repair the various parts. In still other constructions, the various mating parts of the bezel assembly have been threaded, or screws and brake shoes have been used to secure the bezel on the indicator and to apply the proper tension thereto to permit the setting of the indicator dial, and these latter constructions, while permitting a relatively easy disassembly of the indicator, have been relatively expensive from the standpoint of manufacturing cost.

One of the prime objects of the invention is to design a new and improved bezel assembly for dial test indicators which is easy to disassemble to provide ready access to the working parts of the indicator, and which is economical to manufacture and assemble.

A further object of my invention is to provide a bezel assembly for dial test indicators wherein simple and reliable tension means are employed to retain the bezel and dial assembly in any set position while permitting the easy setting of the assembly relative to the indicator hand as desired.

A still further object of the invention is to provide a bezel assembly for dial test indicators which is of simple and durable construction, and which can be easily and rapidly assembled and disassembled so that no parts are injured or harmed beyond repair during such operation.

With the above and other objects in view, the present invention consists in the combination and arrangement of parts, hereinafter more fully described, illustrated in the accompanying drawings, and more particularly pointed out in the appended claim, it being understood that changes may be made in the form, size, proportion, and minor details of construction, without departing from the spirit, or sacrificing any of the advantages of the invention.

Figure 1:
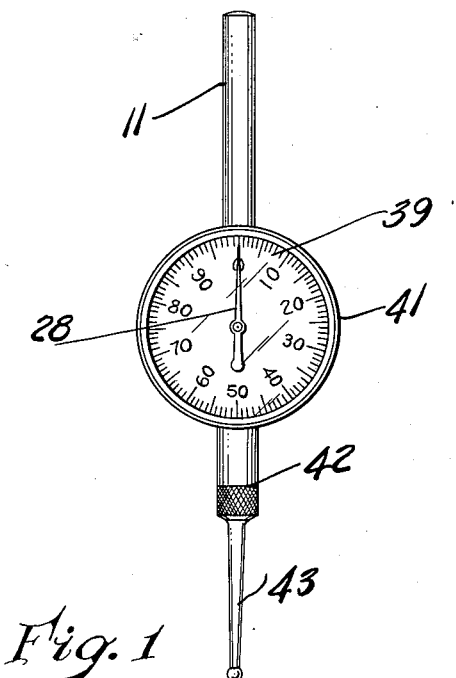
Fig. 1 is a face elevational view of the dial test indicator.
Figure 2:
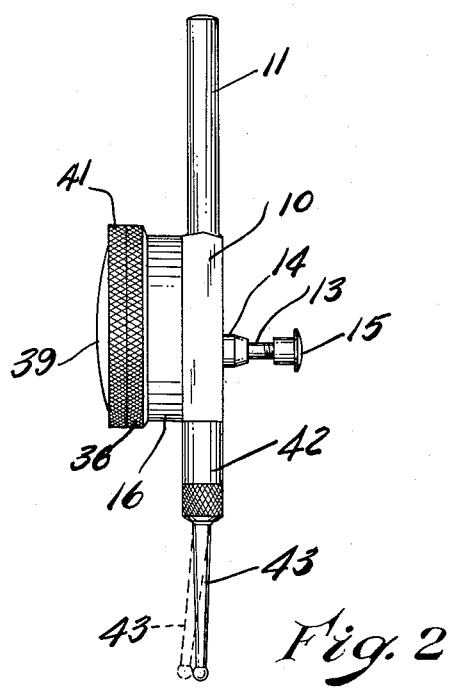
Fig. 2 is an edge elevational view thereof, the broken lines illustrating the adjustment of the lever.

Referring now more particularly to the accompanying drawings in which I have shown a dial test indicator of the general construction previously disclosed in Patent No. 2,345,845, with my new and improved bezel assembly mounted thereon. Broadly, the indicator includes a base 10 with an integrally formed extension or shank 11 formed thereon to facilitate the mounting of the instrument. A passage 12 is formed in the base 10 to receive a plunger 13 which is supported by a bearing 14 secured to the base 10, and a removable contact head 15 is threaded on the outer end of the plunger 13 as usual.

A cylindrical casing 16 is mounted on the base 10 to enclose the working parts of the indicator, and a plate 17 is provided thereabove, the plate 17 being secured in position by screws 18 threaded in openings (not shown), in the spacer posts 19 and 20. The plunger 13 extends through the bottom of the casing 16 into the interior thereof, and a transverse pin 21 is rigidly mounted in the inner end thereof, the one end of the pin 21 engaging a worm cam 22 on a centrally disposed operating shaft 23, and the opposite end extending into a vertical slot or groove 24 formed in the post 20. It will be obvious that an axial movement of the plunger 13 will revolve the shaft 23, and that the plunger itself is prevented from rotating by the disposition of the end of the pin 21 in the groove 24.

Depending from the plate 17 in position to be engaged by the end of the plunger 13 is a stop member 25 to limit the rotation of the shaft 23 as usual, and provided within the casing 16 to normally retain the plunger 13 in its outer position is a spring 26 secured at one end by a screw 27 and at the other by wrapping it around one end of the pin 21. Further, a hair spring 30 is provided on the shaft 23 and connected to the member 25 to materially increase the sensitivity of the device.

An indicator hand 28, having a central hub 29 is non-rotatably mounted on the outer end of the shaft 23, and a dial 31 which is usually graduated in thousandths of an inch is provided thereunder, it being obvious that the worm cam 22 is so pitched that the exact lineal movement of the plunger 13 is accurately represented on the dial 31.

The dial 31 is mounted in a new and unique bezel assembly which can be easily and rapidly disassembled when necessary to obtain access to the interior of the casing 16, and then simply reassembled. Formed in the wall of the casing 16 adjacent the upper edge thereof are a given number of horizontal slots 32, and mounted within the casing and bearing against the inner face of the side wall thereof is a split annular spring 33 which is formed with a predetermined number of circumferentially spaced offset portions 34 to project through the slots 32. The ends of the spring 32 are turned as at 35 to permit them to be more readily grasped when inserting the spring 32.

Figure 3:
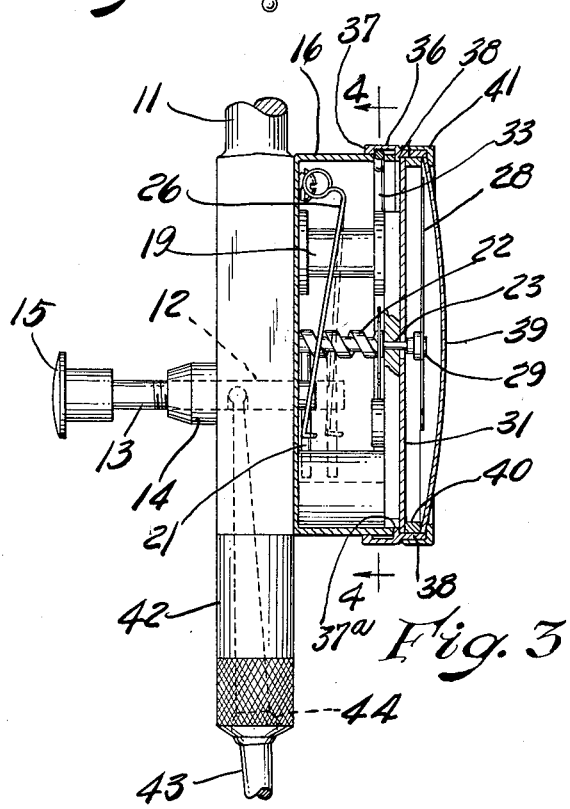
Fig. 3 is an enlarged, edge elevational view similar to Fig. 2, parts being broken away to show the assembly.

A lower bezel member 36 is adapted to be slipped over the upper portion of the casing 16 previous to insertion of the spring 33, the member 36 being formed with a lower flange 37 to space the bezel member 36 from the wall of the casing 16, all as clearly shown in Fig. 3, and it will be apparent that when the spring 33 is inserted, the offset portions 34 of the spring will engage the inner peripheral wall of the member 36 to sufficiently resist rotative movement thereof, so that the member 36 can be set in a given position with relation to the indicator hand 28. Since the flange 37 is disposed directly below the offset portions 34 of the spring 33, the bezel member 36 is also prevented from slipping off the casing 16. An intermediate interior flange 37a is formed on the member 36 to rest on the upper edge of the casing 16, and the graduated dial 31 is mounted on said flange in frictional engagement with a shouldered portion 38 of the bezel member 36, so that the dial 31 revolves with the member 36.

A transparent crystal 39 is supported above the indicator hand 28 by a spacer ring 40 to close off the indicator chamber and prevent dirt and dust from entering the device, and an upper bezel member 41 is adapted to snap over the shouldered portion 38 to retain the crystal in position. The exposed peripheral walls of the bezel members 36 and 41 are knurled as shown to facilitate the setting of the dial, and it will be obvious that the entire bezel assembly revolves as a unit, the upper bezel member 41 frictionally engaging the shouldered portion 38 of the lower bezel member 36.

Shown, but forming no part of the instant invention, is an inside attachment A which is used for checking holes, slots and underside of surfaces and the like. As will be seen, the attachment A comprises a plug 42 threaded in the end of the base 10, and an indicator lever 43 swivelly mounted therein as at 44. The inner end of the lever 43 extends into an opening provided in the plunger 13 which will, of course, be responsive to displacement of the outer end of the lever 43.

Figure 5:
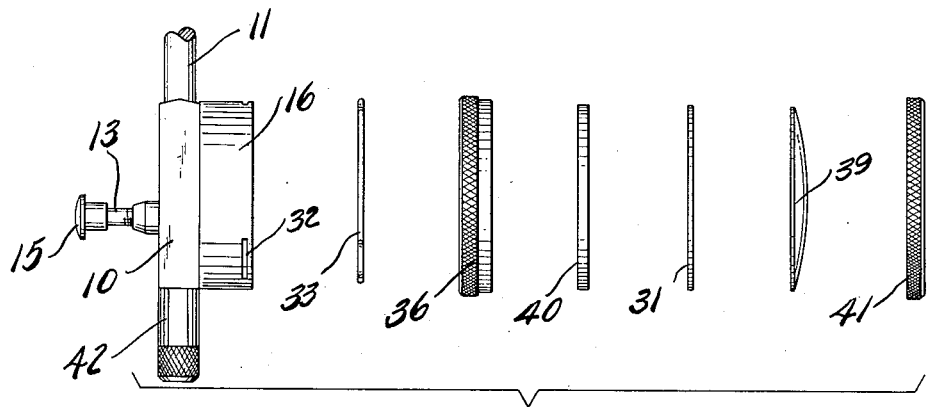
Fig. 5 is an edge elevational view of the bezel parts and assembly.
Figures 4, 6:
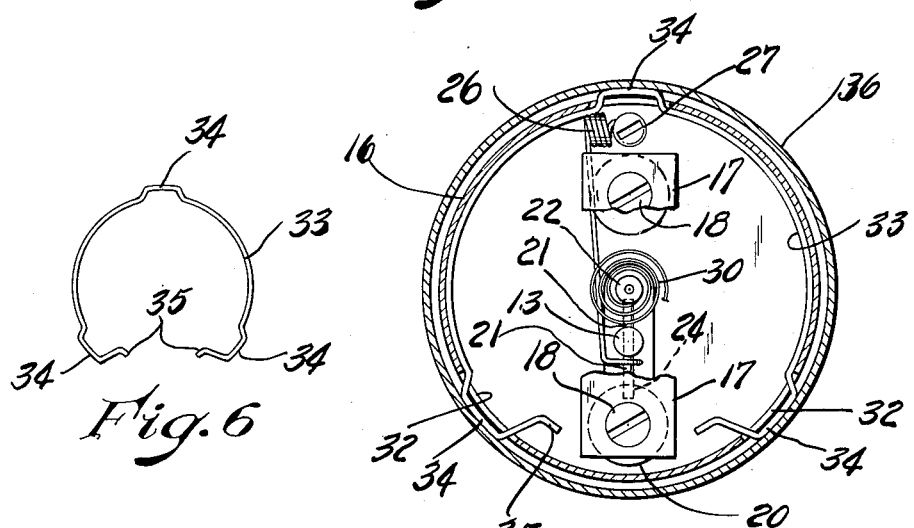
Fig. 4 is a transverse sectional view taken on the line 4—4 of Fig. 3
Fig. 6 is a detail view of the retaining spring.

The dismantling of the bezel assembly when it becomes necessary to gain access to the interior of the casing for replacement or repair of parts is a very simple operation. With particular reference to Fig. 5, the upper bezel member 41 is first pulled off whence the crystal 39, spacer ring 40, indicator arm 28, and dial 31 can be removed, thus exposing the interior of the casing 16. Thence the annular spring 33 may be removed, permitting the upper bezel member to be slipped off. It will be obvious that the assembly is performed in reverse order, and that the initial assembly is exceedingly easy as well as is any subsequent disassembly and reassembly.

From the foregoing description, it will be clearly obvious that I have perfected a very simple, practical and rugged bezel mechanism and assembly which can be quickly and easily assembled and/or disassembled.

What I claim is:

The combination with a dial test indicator having a cylindrical casing with circumferentially spaced openings therethrough near the upper end thereof, an operating shaft extending up through said casing, work engaging means, and means for revolving said shaft responsive to displacement of said work engaging means, of resilient means mounted within said casing and projecting laterally through said openings, a lower bezel member including a knurled cylindrical body portion with a top edge, revolvably mounted on said casing and having a lower flange extending into engagement with the wall of said casing directly under said resilient means, said resilient means engaging the inner peripheral wall of said lower bezel member to resist rotative movement thereof, said lower bezel member including an inwardly directed flange resting on the upper peripheral edge of said casing and an inwardly offset, upwardly directed portion extending above said edge of said casing, a graduated dial having a central opening for the passage of said shaft removably mounted on the inwardly directed flange of said lower bezel member and revolving therewith, an indicator hand removably and non-rotatably mounted on said shaft above said dial, a crystal engaging the top edge of said lower bezel member, means for supporting said crystal above said indicator hand, and an upper bezel member removably mounted over the inwardly offset portion of said lower bezel member for retaining said crystal in position, said upper bezel member including a knurled peripheral wall of such thickness that it is substantially flush with the entire outer peripheral surface of the cylindrical body portion of said lower bezel member.

References Cited in the file of this patent

UNITED STATES PATENTS

| | | |
|---|---|---|
| 968,884 | Reisner | Aug. 30, 1910 |
| 2,226,756 | Emery | Dec. 31, 1940 |
| 2,345,845 | Wells | Apr. 4, 1944 |

FOREIGN PATENTS

| | | |
|---|---|---|
| 92,735 | Switzerland | Nov. 25, 1920 |
| 218,929 | Switzerland | Oct. 9, 1940 |